(No Model.)  
2 Sheets—Sheet 1.

A. H. ELFERS.
STEAM WAGON.

No. 244,117. Patented July 12, 1881.

Witnesses  
Geo. H. Strong  
Frank L. Brooks

Inventor  
August H. Elfers  
By Dewey & Co.  
Attys (No Model.) 2 Sheets—Sheet 2.
A. H. ELFERS.
STEAM WAGON.
No. 244,117. Patented July 12, 1881.
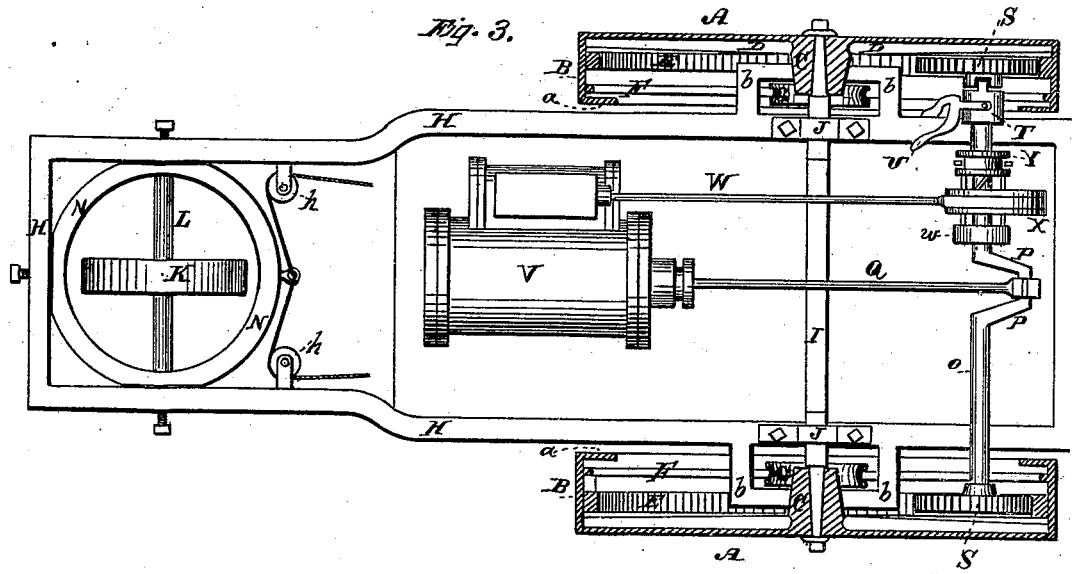
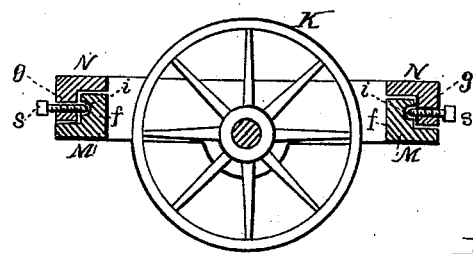
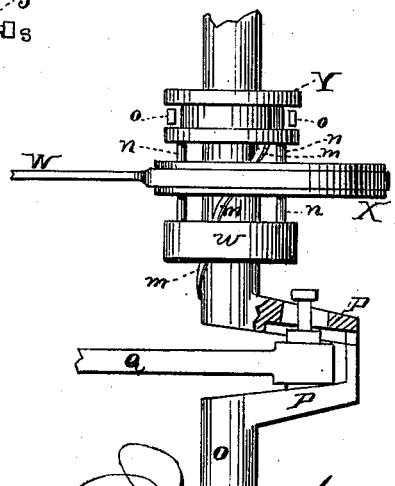
Witnesses
Geo. H. Strong
Frank A. Brook
Inventor
August H. Elfers
By Dewey & Co.
Attys

UNITED STATES PATENT OFFICE.

AUGUST H. ELFERS, OF BAKERSFIELD, CALIFORNIA, ASSIGNOR OF ONE-FIFTH TO OTTO THRONSEN, OF SAME PLACE.

STEAM-WAGON.

SPECIFICATION forming part of Letters Patent No. 244,117, dated July 12, 1881.

Application filed April 6, 1881. (No model.)

*To all whom it may concern:*

Be it known that I, AUGUST H. ELFERS, of Bakersfield, county of Kern, State of California, have invented an Improved Steam-Wagon; and I hereby declare the following to be a full, clear, and exact description thereof.

My invention relates to that class of wagons specially adapted for the use of steam as a motor, and known as "steam-wagons;" and it consists in certain details of construction, as hereinafter described and claimed.

Figure 1:
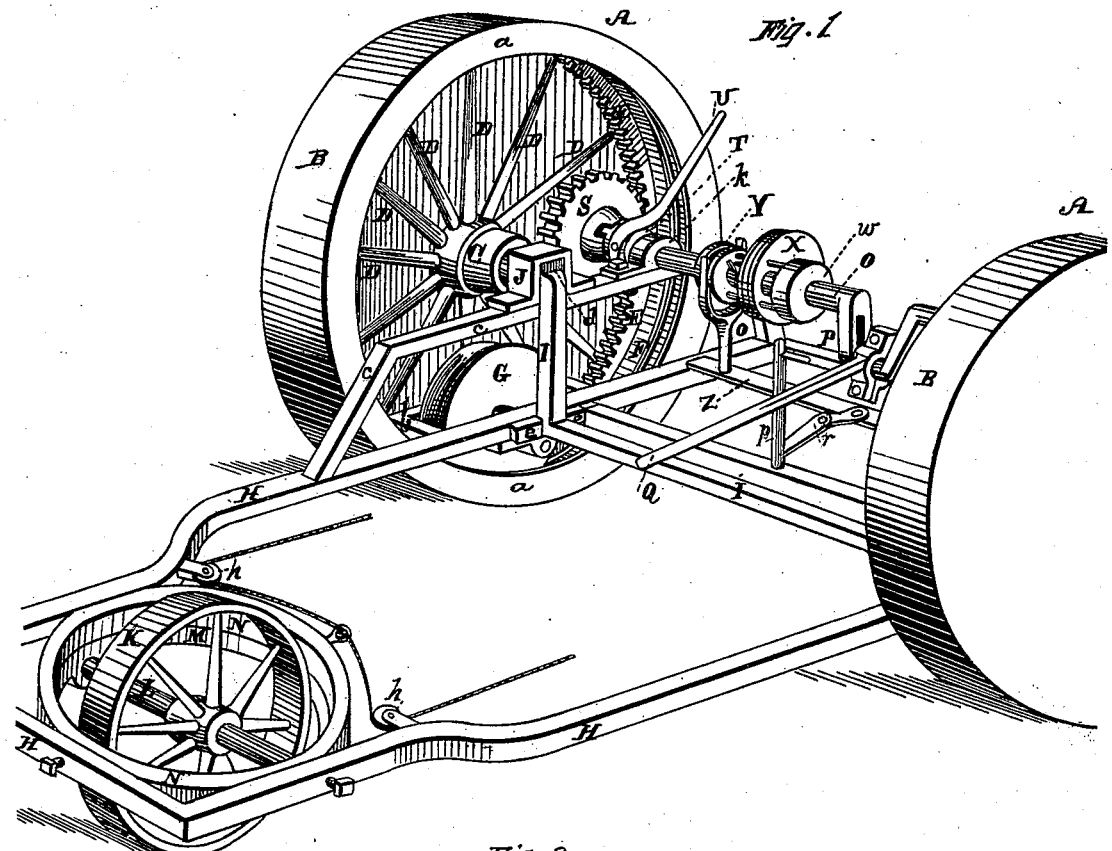
Figure 2:
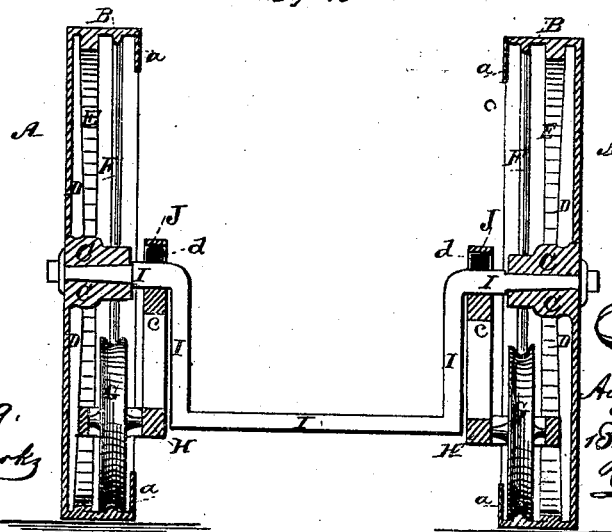

Referring to the accompanying drawings, Figure 1 is a perspective view of my invention. Fig. 2 is a transverse vertical section. Fig. 3 is a longitudinal horizontal section. Figs. 4 and 5 are details of construction.

Let A A represent the large wheels, having a wide rim, B, as shown, and hubs C, of cast-steel, said hubs widening toward their outer ends for the purpose of strength, and to receive the spokes D. These spokes are headed into the hub, and proceed through the outer edge of the rim B and are screwed therein. They can thus be tightened with a wrench when they become loose. There are no spokes upon the inner side of the wheel. The outer sides of the wheels are covered or inclosed with a thin metal sheet, and the inner sides of the wide rims B are provided with flanges a. Thus the dust and dirt are kept out as much as possible.

Inside of the rim, and toward the outer edge, is the internal gear-wheel E, made heavy and of the best material, and for the sake of convenience in inserting is made of three sections. It is fastened to the inside of the rim with screw-bolts passing through said rim. Upon the inner side of the rim, next to the gear-wheel, and inside of the flange a, is the raised central track, F. Upon this track, within the large wheels, travel the smaller wheels G, having a grooved face to fit the track F. These wheels are journaled in an extended side portion, b, of the main frame or body H of the wagon, which said frame has side supports, c, upon which is supported the bent axle I of the main wheels.

The large wheels are journaled upon the ends of the axle I, as shown. Clips or caps J hold the axle I in place, and have rubber buffers d between their under surfaces and the top of the axle, for the purpose of preventing great jar and to allow the axle to have a slight vertical play.

Guides e on the frame, on each side of the bent arms of the axle I, prevent any side play, while allowing a vertical movement.

It will be seen that the whole weight of the forward end of the frame or body H is upon the small wheels G within the large wheels, thus lowering the center of gravity of the wagon. These wheels are made strong to bear the tractive force applied to them. The smooth track and grooved surface of the wheels G will permit them to run very easily. The weight being taken off the large wheels, they can be made large and light, even at the expense of some strength.

The rear end of the frame or body H is supported by the guiding or steering wheel K, the shaft L of which is journaled in boxes attached to a circular frame, M, having a flange, $f$, on its inner side, provided with a peripheral groove, $i$. This frame fits under a circular frame, N, attached to the body H, having a flange, $g$, in its outer side, against which the raised flange $f$ fits.

Pins $s$ pass through the stationary frame into the groove $i$ in the flange $f$. Thus the frame M, with its guiding-wheel K, may be turned around from side to side, and is held well in place. Small pulleys $h$, I have here shown for ropes connected with the circular movable frame M to pass over. These ropes are carried to any convenient point, and the wagon is thus guided or steered in a manner similar to the way in which a ship is steered. It is obvious that I could use this steering apparatus in front, if preferable.

In the forward part of the frame, within appropriate boxes $k$ on the side supports, $c$, is journaled the driving-shaft O, having a crank, P, at its center, to which the crank-rod or pitman Q is attached. This crank O is rendered adjustable in its connection with the pitman, to shorten or lengthen the stroke, and thereby accommodate it to whatever engine may be used. This is accomplished in any ordinary manner.

The ends of the driving-shaft O extend within the great wheels A, and have loosely journaled upon them the gear-wheels S, which engage with the gears E upon the rim of the great wheels. The hubs of these gear-wheels S have notches thereon to receive the clutches T, which slide upon and are secured to the shaft O, and are provided with operating-levers U. Thus the gear-wheels S are secured to or allowed to remain loose upon the driving-shaft, and are made to engage with the gears E and drive the large wheels, or are rendered inoperative by withdrawing the clutches T.

If I find it necessary for the support of the driving-shaft O, I can further journal it in standards rising from the frame H and receiving the shaft near the crank P on each side.

V represents the cylinder of the steam-engine, and W the eccentric or valve rod attached to the eccentric X, fitting loosely upon the driving-shaft.

In order to reverse the engine and drive the wagon in an opposite direction, I here show a peculiar construction whereby I am enabled to do this with simply one eccentric by changing the throw of said eccentric.

Y represents a clutch fitting loosely upon the shaft, and having grooves oppositely placed on its inner side, into which fit ribs or feathers m, cast with or secured upon opposite sides of the shaft in a spiral course. The clutch is provided with long pins or rods n, fitting loosely through holes in the eccentric. On the other side of the eccentric is the supplementary clutch w, constructed as the clutch Y, with grooves fitting the spiral ribs on the driving-shaft. This clutch receives and retains the rods or pins n for the purpose of strengthening them. These pins n are made of sufficient length to allow the play of the clutches. When the eccentric stands in position for the forward stroke and it is desired to reverse the engine, the eccentric may be turned to accomplish this by pushing the clutch Y away from it, which, traveling upon the spiral ribs, forces its pins to turn the eccentric. The eccentric is held to the shaft within certain limits by the clutch Y.

In order to operate the clutches, I place a sliding plate, Z, upon the frame H, having a standard, o, with curved arms embracing the grooved face of the clutch Y.

An upright rod, p, pivoted appropriately to the frame H, is secured to the sliding plate by a jointed connecting-lever, r, so that by turning the rod p the plate Z may be made to slide back and forth to move the clutch Y, and with it the supplementary clutch w and the eccentric.

It is obvious that if there are two eccentrics, one on each side of the crank, the same construction would apply, and another arm similar to that of o upon the same sliding plate could operate the other clutch.

This wagon will not require a special engine. By making the crank adjustable it can be made to accommodate itself to the stroke of almost any engine, and hence a farmer who has already a steam-thrasher engine can use it to drive this wagon by removing it from its own truck and placing it upon the wagon, and connecting its piston-rod with the driving-shaft and adjusting the crank to the stroke of the engine. Its advantages are numerous and need not be here further mentioned, its utility being hereinbefore shown.

Having thus described my invention, what I claim as new, and desire to secure by Letters Patent, is—

The large wheels B, provided with interior gears, E, and ribs F, and mounted on bent axles I, in combination with frame H and wheels G, arranged to travel on said rib, for the purpose specified.

In witness whereof I have hereunto set my hand.

AUGUST HENRY ELFERS.

Witnesses:
S. H. NOURSE,
FRANK A. BROOKS.